(12) United States Patent  (10) Patent No.: US 7,463,283 B2
Silverbrook  (45) Date of Patent: Dec. 9, 2008

(54) CAMERA AND ASSOCIATED PRINTER APPARATUS

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 610 days.

(21) Appl. No.: 10/503,918

(22) PCT Filed: Feb. 12, 2003

(86) PCT No.: PCT/AU03/00149

§ 371 (c)(1),
(2), (4) Date: Aug. 9, 2004

(87) PCT Pub. No.: WO03/069893

PCT Pub. Date: Aug. 21, 2003

(65) Prior Publication Data

US 2005/0225641 A1  Oct. 13, 2005

(30) Foreign Application Priority Data

Feb. 13, 2002  (AU)  ................................ PS0498

(51) Int. Cl.
*H04N 5/225* (2006.01)
(52) U.S. Cl. ................ 348/207.2; 348/373; 347/86
(58) Field of Classification Search ........... 347/2, 347/86, 87; 358/906, 909.1; 348/372–376, 348/207.2, 373; 400/88, 624
See application file for complete search history.

(56) References Cited

U.S. PATENT DOCUMENTS

| | | | |
|---|---|---|---|
| 5,274,561 A | 12/1993 | Adams et al. | |
| 5,469,199 A * | 11/1995 | Allen et al. | 347/42 |
| 5,966,285 A * | 10/1999 | Sellers | 361/686 |
| 5,999,203 A | 12/1999 | Cane et al. | |
| 6,115,137 A | 9/2000 | Ozawa et al. | |
| 6,195,513 B1 | 2/2001 | Nihei et al. | |
| 6,238,111 B1 | 5/2001 | Silverbrook | |
| 6,256,063 B1 | 7/2001 | Saitio et al. | |
| 6,317,192 B1 * | 11/2001 | Silverbrook et al. | 355/18 |
| 6,327,570 B1 * | 12/2001 | Stevens | 705/7 |
| 6,378,997 B1 * | 4/2002 | Nitta | 347/85 |
| 6,445,461 B1 | 9/2002 | Ozawa et al. | |

FOREIGN PATENT DOCUMENTS

| | | |
|---|---|---|
| DE | 29519180 U1 | 6/1996 |
| DE | 19754224 A1 | 6/1998 |
| DE | 19907003 A1 | 8/2000 |
| EP | 0382044 | 8/1990 |
| JP | 10-191226 A | 7/1998 |
| JP | 10173833 | 10/2001 |
| KR | 0239603 | 10/2001 |
| WO | WO 99/01859 A | 1/1999 |
| WO | W0-0072129 | 11/2000 |
| WO | WO-0102905 | 1/2001 |

* cited by examiner

*Primary Examiner*—Lin Ye
*Assistant Examiner*—Nelson D Hernández

(57) ABSTRACT

An image printing system includes a portable data capturing device for capturing data relating to an image which it is desired to print. A processor communicates with the data capturing device for processing output data which is output from the data capturing device to provide formatted data suitable for printing. An onboard printing unit is mounted onboard a vehicle and is associated with the processor for printing the formatted data to provide the image.

25 Claims, 14 Drawing Sheets

CAMERA AND ASSOCIATED PRINTER APPARATUS

CROSS REFERENCES TO RELATED APPLICATIONS

The present application is a 371 of PCT/AU03/00149 filed on Feb. 12, 2003.

FIELD OF THE INVENTION

This invention relates to an image printing system. The invention relates particularly, but not necessarily exclusively, to an image printing system and to a method of printing images for use in or on a conveyance.

In this specification, unless the context clearly indicates otherwise, the term "conveyance" is to be understood in a broad sense as any suitable device for conveying persons and/or goods and includes road vehicles, aircraft, rail vehicles, waterborne craft, spacecraft, or the like.

BACKGROUND TO THE INVENTION

Persons on trips such as holidays generally take a number of photographs at various locations in order to create a collection of images which may later be used to assist in recalling experiences or events of significance that occurred during the holiday. Also, there are times when, for business or other purposes, it is required to record an image. For example, at the scene of an accident, it may be necessary to take photographs of damaged vehicles and surrounding areas in order to conduct an investigation as to the cause of the accident.

Typically, photographs are taken using one of a known number of photographic techniques such as exposure of a photographic film or, as is becoming increasingly popular, by digital capture of an image. Each film or memory storage device that is used to store photographs has a limited capacity. Thus, in the case of photographic film the number of images which can be recorded depends on the length of the film. In the case of storing digital images, the resolution of the images and the memory capacity are determinative of the number of images which can be stored. Once the capacity of the storage means has been reached, the storage means must be replaced in order to capture further images.

Further, in order to produce hard copies of the recorded images it is necessary to either take the storage means (or the camera itself if the storage means is not removable) to an imaging bureau for production of hard copies or to print off a copy of each photograph using a PC and a printer. Both of these approaches tend to be somewhat inconvenient as result of, firstly, the time taken to produce the hard copy images and, secondly, the different location that the storage device must be transported to in order to produce hard-copies. A third inconvenience is having to make necessary film and/or storage medium changes once the capacity of the storage means has been reached. This is particularly so in the case of digital cameras where memory storage devices can be expensive.

CO-PENDING APPLICATIONS

Various methods, systems and apparatus relating to the present invention are disclosed in the following co-pending applications filed by the applicant or assignee of the present invention simultaneously with the present application:

| | | |
|---|---|---|
| PCT/AU03/00154 | PCT/AU03/00151 | PCT/AU03/00150 |
| PCT/AU03/00145 | PCT/AU03/00153 | PCT/AU03/00152 |
| PCT/AU03/00168 | PCT/AU03/00169 | PCT/AU03/00170 |
| PCT/AU03/00162 | PCT/AU03/00146 | PCT/AU03/00159 |
| PCT/AU03/00171 | PCT/AU03/00149 | PCT/AU03/00167 |
| PCT/AU03/00158 | PCT/AU03/00147 | PCT/AU03/00166 |
| PCT/AU03/00164 | PCT/AU03/00163 | PCT/AU03/00165 |
| PCT/AU03/00160 | PCT/AU03/00157 | PCT/AU03/00148 |
| PCT/AU03/00156 | PCT/AU03/00155 | |

The disclosures of these co-pending applications are incorporated herein by cross-reference.

RELATED PATENT APPLICATIONS AND PATENTS

| | | | | |
|---|---|---|---|---|
| 6566858 | 6331946 | 6246970 | 6442525 | PCT/AU01/00141 |
| 09/505951 | PCT/AU01/00139 | 6816968 | 6757832 | PCT/AU01/00140 |
| PCT/AU00/00741 | 6238044 | PCT/AU00/00742 | 6425661 | 6227652 |
| 6213588 | 6213589 | 6231163 | 6247795 | 6394581 |
| 6244691 | 6257704 | 6416168 | 6220694 | 6257705 |
| 6247794 | 6234610 | 6247793 | 6264306 | 6241342 |
| 6247792 | 6264307 | 6254220 | 6234611 | 6302528 |
| 6283582 | 6239821 | 6338547 | 6247796 | 6557977 |
| 6390603 | 6362843 | 6293653 | 6312107 | 6227653 |
| 6234609 | 6238040 | 6188415 | 6227654 | 6209989 |
| 6247791 | 6336710 | 6217153 | 6416167 | 6243113 |
| 6283581 | 6247790 | 6260953 | 6267469 | 6273544 |
| 6309048 | 6420196 | 6443558 | 6439689 | 6378989 |
| 6848181 | 6634735 | PCT/AU98/00550 | PCT/AU00/00095 | 6390605 |
| 6322195 | 6612110 | 6480089 | 6460778 | 6305788 |
| PCT/AU00/00172 | 6426014 | PCT/AU00/00338 | 6364453 | PCT/AU00/00339 |
| 6457795 | PCT/AU00/00581 | 6315399 | PCT/AU00/00580 | 6338548 |
| PCT/AU00/00582 | 6540319 | PCT/AU00/00587 | 6328431 | PCT/AU00/00588 |
| 6328425 | PCT/AU00/00589 | 6991320 | PCT/AU00/00341 | 6595624 |
| PCT/AU00/00340 | PCT/AU00/00749 | 6417757 | PCT/AU01/01332 | 7095309 |
| PCT/AU01/01318 | 6854825 | PCT/AU00/00750 | 7075677 | PCT/AU00/00751 |
| 6428139 | PCT/AU00/00752 | 6575549 | PCT/AU01/00502 | PCT/AU00/00583 |
| 6383833 | PCT/AU02/01120 | PCT/AU00/00593 | 6464332 | PCT/AU00/00333 |

-continued

| | | | | | |
|---|---|---|---|---|---|
| PCT/AU00/01513 | 6428142 | PCT/AU00/00590 | 6390591 | PCT/AU00/00591 | |
| 7018016 | PCT/AU00/00592 | 6328417 | PCT/AU00/00584 | 6322194 | |
| PCT/AU00/00585 | 6382779 | PCT/AU00/00586 | 6629745 | PCT/AU00/01514 | |
| 6565193 | PCT/AU00/01515 | 6609786 | PCT/AU00/01516 | 6609787 | |
| PCT/AU00/01517 | 6439908 | PCT/AU00/01512 | 6684503 | PCT/AU00/00753 | |
| 6755513 | PCT/AU00/00594 | 6409323 | PCT/AU00/00595 | 6281912 | |
| PCT/AU00/00596 | 6604810 | PCT/AU00/00597 | 6318920 | PCT/AU00/00598 | |
| 6488422 | PCT/AU01/01321 | 6655786 | PCT/AU01/01322 | 6457810 | |
| PCT/AU01/01323 | 6485135 | PCT/AU00/00516 | 6795215 | PCT/AU00/00517 | |
| 7154638 | PCT/AU00/00511 | 6859289 | PCT/AU00/00754 | 6977751 | |
| PCT/AU00/00755 | 6398332 | PCT/AU00/00756 | 6394573 | PCT/AU00/00757 | |
| 6622923 | | | | | |

SUMMARY OF THE INVENTION

According to first aspect of the invention, there is provided an image printing system which includes:
- a portable data capturing device for capturing data relating to an image which it is desired to print;
- a processing means, in communication with said data capturing device, for processing output data which is output from said data capturing device to provide formatted data suitable for printing; and
- an onboard printing unit, associated with said processing means, for printing said formatted data to provide said image.

In this specification, unless the context clearly indicates otherwise, the term "onboard" is to be understood in a broad sense as a device and its components which are mounted in a conveyance.

The data capturing device may be a camera and is, preferably, a digital camera.

The system may include a receiving means which communicates with the camera to enable data relating to an image captured by the camera and stored in the camera to be received and downloaded to the processing means.

The system may include a communications sub-system mounted in the conveyance for enabling data stored in the data capturing device to be transmitted to a remote location.

The processing means may include a layout engine in communication with the detecting means. The layout engine may lay out data elements to be communicated to the printer so that, when printed on a suitable print media, the data are presented as a visually discernible image.

The processing means may further comprise a data manipulating means in communication with the layout engine for manipulating the data to provide the formatted data.

The printing unit may include a printer controller, for receiving the formatted data to be printed, and a printer. The printer may be a full color printer. Preferably, the printer is a photo quality color printer.

Still further, the printer may be an ink jet printer. The printer may comprise a pagewidth ink jet printhead. Thus, the printhead may comprise an array of nozzles, said array being fabricated by microelectromechanical techniques.

According to a second aspect of the invention, there is provided a method of printing images, the method including the steps of:
- capturing data, via a data capturing means, relating to an image which it is desired to print;
- processing output data, which is output from said data capturing means, to provide formatted data suitable for printing; and
- printing, on an onboard printing unit associated with said processing means, said formatted data to provide said image.

The method may include capturing the data by means of a camera which is, preferably, a digital camera.

The method may include causing the camera to communicate with a receiving means in the conveyance to enable data relating to an image captured by the camera and stored in the camera to be received and downloaded.

Further, the method may include causing data stored in the data capturing device to be transmitted to a remote location.

In addition, the method may include performing a layout operation on data elements to be communicated to the printer so that, when printed on a suitable print media, the data are presented as a visually discernible image.

The method may also include manipulating said data prior to printing the data to provide said formatted data.

According to a third aspect of the invention, there is provided an onboard image printing system which includes
- a camera for capturing data relating to an image which it is desired to print;
- a processing means, in communication with said camera, for processing output data which is output from said camera to provide formatted data suitable for printing; and
- an onboard printing unit, associated with said processing means, for printing said formatted data to provide said image.

The system may include a receiving means which communicates with the camera to facilitate downloading of the data from the camera to the processing means.

According to a fourth aspect of the invention, there is provided a method of printing images onboard a vehicle, the method including the steps of:
- capturing data, via a camera, relating to an image which it is desired to print;
- processing output data, which is output from said camera, to provide formatted data suitable for printing; and
- printing, on an onboard printing unit associated with said processing means, said formatted data to provide said image.

The method may include causing the camera to communicate with a receiving means in the vehicle to facilitate downloading of data relating to an image captured by the camera to a processing means.

According to a fifth aspect of the invention, there is provided an onboard image printing system which includes
- a digital camera for capturing data relating to an image which it is desired to print;
- a processing means, in communication with said camera, for processing output data which is output from said camera to provide formatted data suitable for printing;

a receiving means which communicates with the camera to facilitate downloading of the data from the camera to the processing means;

an onboard communications sub-system for enabling data stored in the camera to be transmitted to a remote location; and an onboard printing unit, associated with said processing means, for printing said formatted data to provide said image.

According to a sixth aspect of the invention, there is provided a method of printing images onboard a vehicle, the method including the steps of:

capturing data, via a digital camera, relating to an image which it is desired to print;

processing output data, which is output from said camera, to provide formatted data suitable for printing;

causing the camera to communicate with a receiving means in the vehicle to facilitate downloading of data relating to an image captured by the camera;

causing data stored in the camera to be transmitted to a remote location; and printing, on an onboard printing unit associated with said processing means, said formatted data to provide said image.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
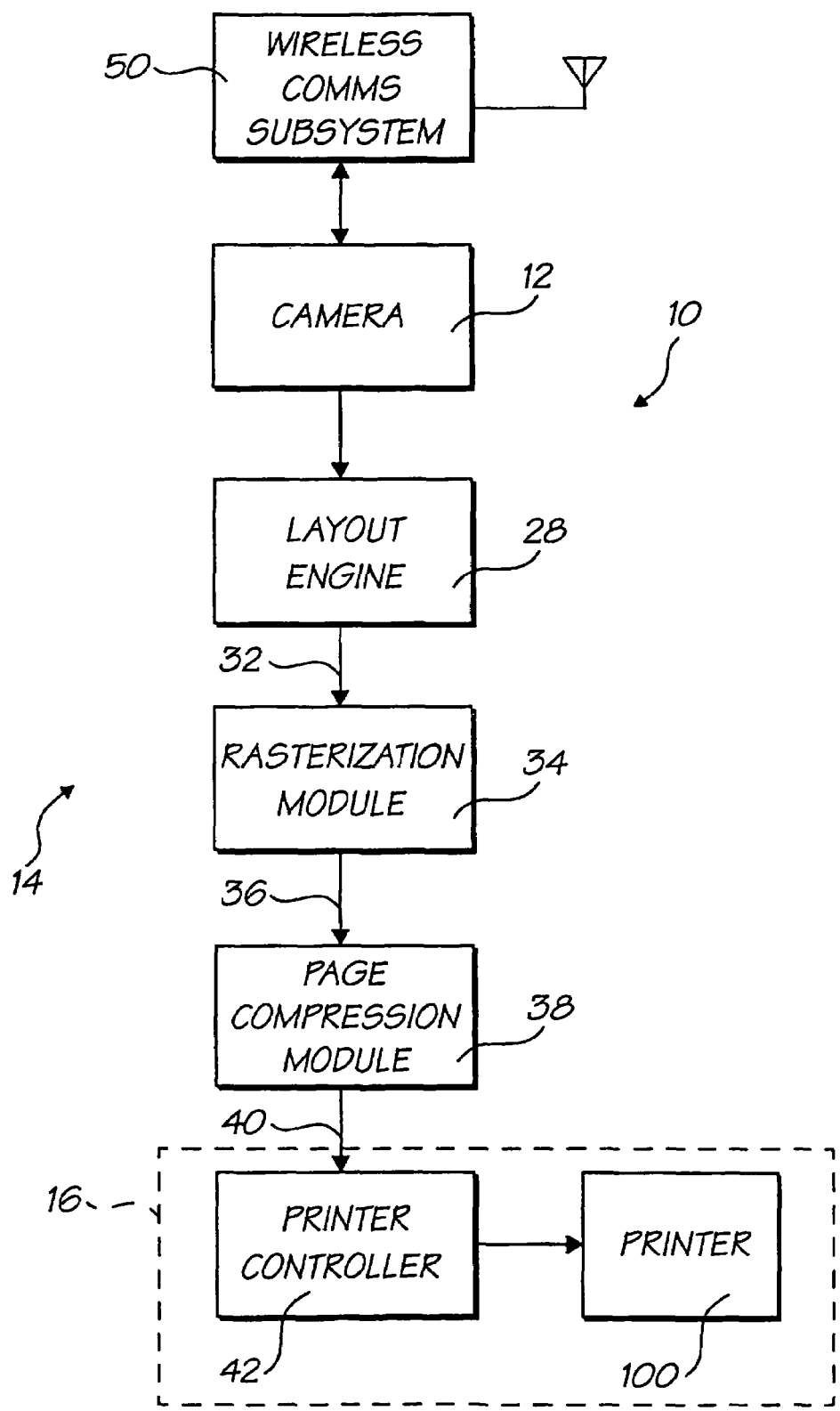
FIG. 1 shows a block diagram of an image printing system, in accordance with the invention.
Figure 2:
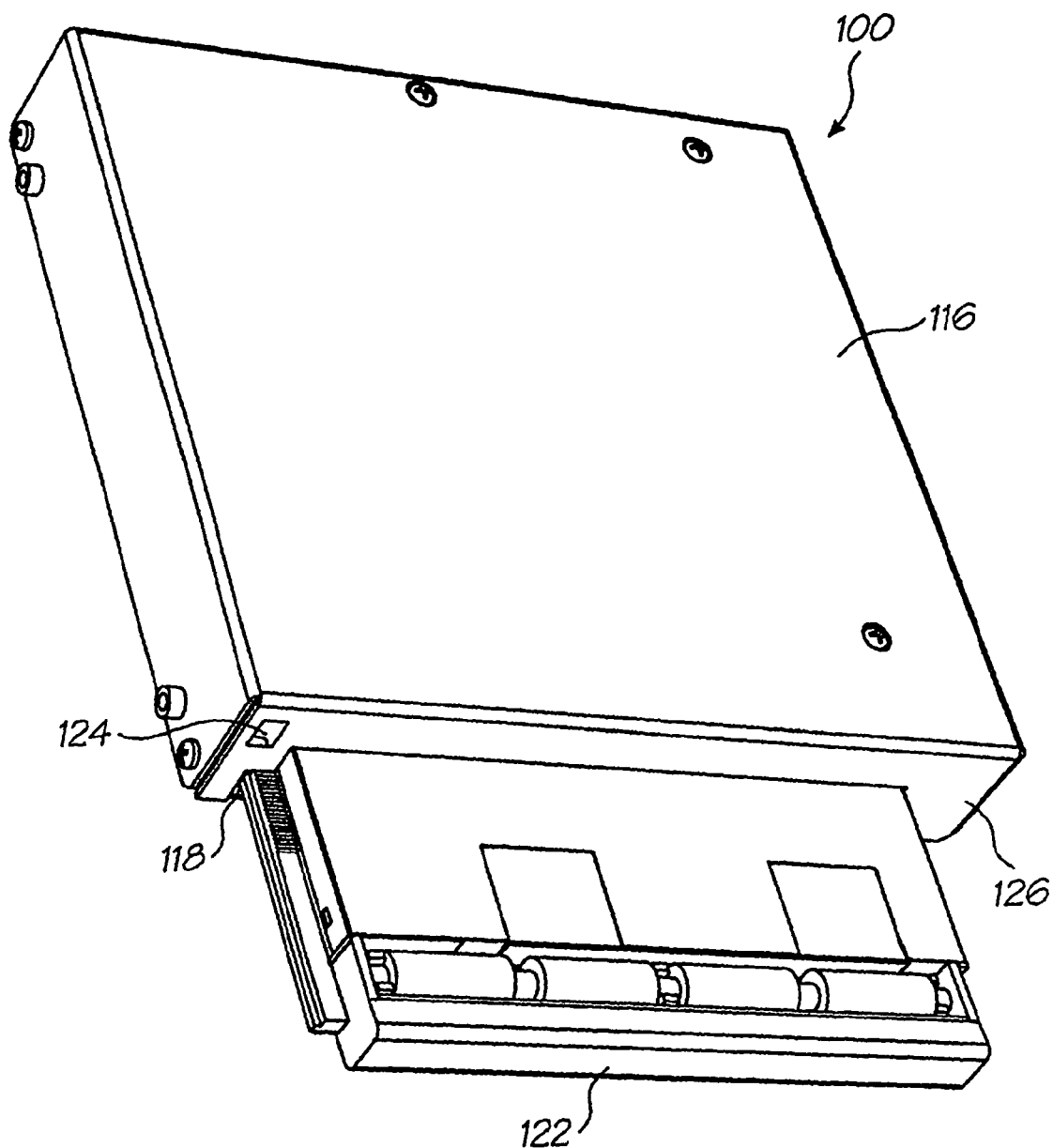
FIG. 2 shows a three dimensional view of a printer for use with the system.

Referring initially to FIG. 1 of the drawings, an image printing system, in accordance with the invention is illustrated and is designated generally by the reference numeral 10. The system 10 is intended particularly for providing hardcopies from digital cameras and is intended to be installed in a motor vehicle (not shown).

Accordingly, the system 10 includes a digital camera 12. The digital camera 12 is received in a suitable receptacle such as a slot 510 (FIG. 16) in an in car entertainment unit 500. Instead, the camera 12 can be received in a dedicated slot in a dashboard or other convenient fitting of the motor vehicle to communicate with the remaining parts of the system 10.

The system 10 further includes a processing means 14 which is able to be placed in communication with the camera 12 when the camera 12 is in its slot. It will be appreciated that the camera 12 has contacts thereon which, when the camera 12 is driven home in its slot, engage contacts in a base of the slot. The contacts in the base of the slot are, in turn, electrically connected to the processing means 14 to enable communication to be established between the camera 12 and the processing means 14.

The processing means includes a layout engine 28 which communicates with a rasterization module 34 via a data line 32. The rasterization module, in turn, communicates with a page compression module 38 of the processing means 14 via a data line 36.

The system 10 includes a printing unit 16 having a printer controller 42 in communication with the page compression module 38 of the processing means 14 via a data line 40. The printer controller 42 controls operation of a printer 100 of the printing unit 16.

In addition, the system 10 includes a wireless communications sub-system 50. The wireless communications sub-system 50 enables images captured by the camera 12 to be transmitted to a remote location, in addition to being printed on a printer 100 of the printing unit 16.

Certain of the components of the system 10 are now described in greater detail.

Figure 15:
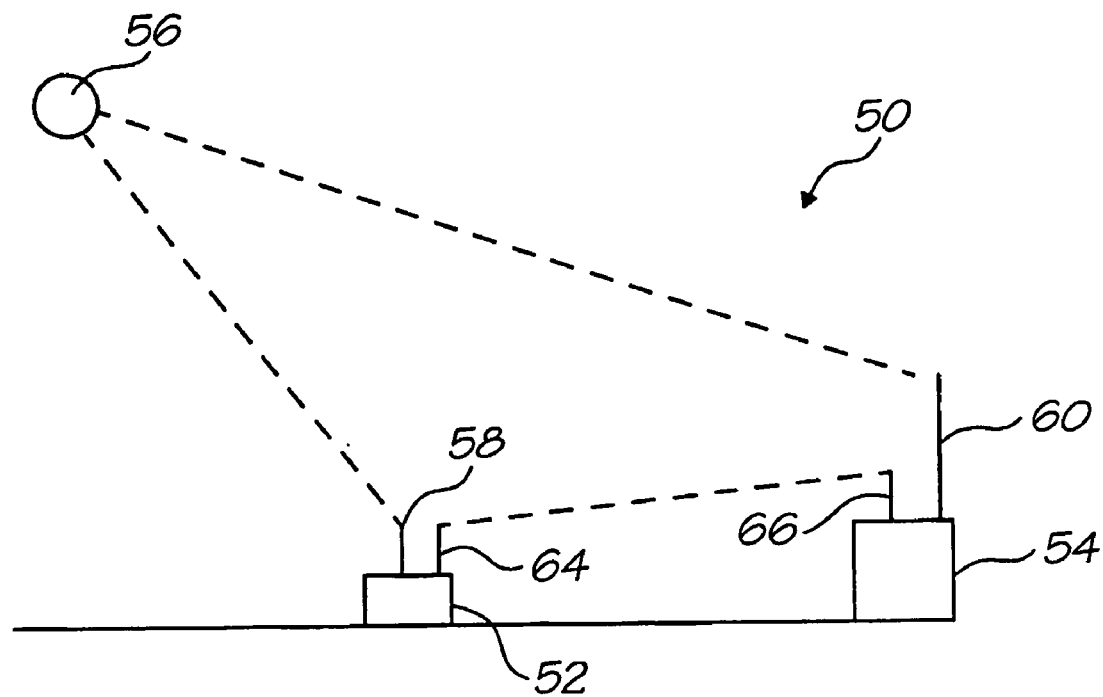
FIG. 15 shows a schematic block diagram of a wireless communications sub-system forming part of the image printing system of FIG. 1.

Referring to FIG. 15 of the drawings, various forms of wireless communications sub-system 50 could be employed. One technique is to use a combination of satellite communications and a mobile telephone network.

The sub-system 50 includes a mobile station 52 (being the motor vehicle in this invention) and a fixed station 54. A satellite is designated generally by the reference numeral 56. The satellite 56 communications with the mobile station 52 via a satellite receiver 58. The satellite 56 also communications with the base station 54 via a satellite up link 60.

In addition, the mobile station 52 includes a mobile phone network based transmitter 64 which communicates with a mobile phone network based receiver 66 at the bay station 54.

To enable data to be transmitted from the mobile station 52 to the base station 54, satellite transmission via the satellite 56 is employed as well as the mobile telephone network using the transmitter 64 and the receiver 66.

The layout engine 28 may be required to manipulate data sourced from a plurality of sources. This data may have no embedded layout information. Depending on the kind of content supplied, it may be necessary to firstly create a formatted description of the content which can then be used to generate one or more pages of page description language.

The page description language to be generated by the layout engine 28 determines the kinds of data elements, and the structuring of elements that may be used to compose a page. For example, if the page description language used is postscript, then the elements that are used to describe the page include filled and stroked paths consisting of line segments and curves, text with corresponding font definitions, and images.

A template for laying out data may be dynamically generated by the layout engine 28 based on user choices, may be a static built-in template, or may even be obtained from some other source such as the source suppling the data.

A number of possibilities exist for layout and content descriptions that can be used to generate a set of consistent layouts for a page containing a number of elements which may be both textual and graphical.

One example of a method of data layout that allows data to be sourced from a plurality of separate locations is through using a combination of XML (eXtensible Markup Language) and XSL (eXtensible Stylesheet Language).

XML allows content to be marked up by applying a set of tags to the content. The definition of each tag in particular XML content is described in a separate scheme referenced by the XML.

XSL provides a method of transforming XML into another format (for example HTML) whilst simultaneously performing selection and filtering operations.

The combination of XML content and XSL as a layout specification allows for descriptions of one or more pages to be produced in a formatting language. The formatting language may then be translated into a page description language suitable for printing (ie, one that provides descriptions of objects, their locations and compositing details).

Another possible layout and content description which can be used is a document which is specified in HTML (Hyper Text Markup Language) which is supplied to the layout engine 28 for the purposes of creating a page description. One or more stylesheets specified according to CSS (Cascading Style Sheet) standard may also be supplied, allowing the layout engine 28 to associate a supplied style with a set of tags. If no style sheet is supplied a set of default styles internal to the layout engine 28 is adopted.

The HTML document is then translated into a page description language suitable for printing.

The rasterization module 34 is provided to convert from page description language into a format that can be sent to the print engine (not shown) of the printer 100. This format may take a number of forms depending on the characteristics of the print engine such as the color gamut of the output device, the types of markers to be used, the number of markers being used (and their respective colors) and the medium being marked.

The page description received by the rasterization module 34 may also take a number of forms. Many page description languages are program oriented in that a page is described in a pragmatically generated manner. Other page description languages describe pages in terms of a set of objects placed on a page by way of a painter's algorithms. Still other page description languages describe a page in terms of a compositing model that defines a hierarchy of objects located on a page, each with a defined compositing order relative to a neighborhood of other objects.

A number of ways exist in which rasterization of a page, a set of pages, a sub-set of objects on a page or a sub set of objects on a number of pages may be processed by the rasterization module 34.

One method of rasterization involves a divide-and-conquer approach in which the page description language is initially interpreted to form a model of the page. The page is scanned and objects are rasterized as they are encountered and then composited to from pixmap output for a portion of the page. The pixmap is then mapped into the color space of the output device or dithered (or error defused) to match the characteristics required by the output device.

Another method of rasterization which may be employed by the rasterization module 34 is to render each object in fill or partially according to the type of object the coverage of the object with respect to the page (and the portion of the page currently being rendered) and caching aspects of the object. For instance, if a character string is to be rasterized, each character in the string may be rasterized in full and then cached for later reuse whereas a filled rectangle may only be rasterized as necessary.

Depending on the output requirements for the rasterization module 34, each page to be rasterized may be generated in its entirety or generated in a band wise fashion for forwarding to the page compression module 38. In this way, if a page is larger than a certain size, and memory needs to be conserved, a page may be divided into a number of bands that may be rasterized on demand.

The page compression module 38 is provided to reduce the amount of rasterized page data that needs to be transferred to the printer controller 42. The page data is compressed using one or more of a number of techniques that do not result in a visible degradation in the quality of the final printed image.

A method of compressing contone data is JPEG compression. With this compression technique, contone pixels are converted into a luminance/chrominance representation which may then efficiently be compressed by using quantization of a discrete cosine transformation of the data. This quantized version of the data is entropy coded to reduce large runs of zero valued elements resulting in an overall 10:1 reduction in data size with virtually no resulting significant loss of image quality.

The wavelet transform, as adopted by the JPEG 2000 standard, is a method used to compress contone data. Two different wavelet transforms are specified by JPEG 2000, namely, a 9/7 wavelet transform for lossy compression and a 5/3 3 wavelet transform for lossless compression. Given that the results of compression using the 9/7 wavelet transform are visually superior to the results of compression using the discrete cosine transform, it is reasonable to expect that a compression ratio of at least 50:1 can be achieved without significant degradation of the reconstructed image.

The scan order adopted by JPEG 2000 is a spiral scan of the original image, traversed one pixel at a time. This is not convenient for printing applications since it would require that the complete page be decoded and stored or that the page be decoded multiple times for printing to be carried out. To remedy this, it may be possible to adopt an alternative scan order that traverses each image row in sequence such that each portion of the image received can be immediately decoded and printed independently of the receipt of the complete compressed page.

Compression of bilevel images may be performed by using the commonly known Group 3 or Group 4 fax algorithms. These algorithms exploit the two dimensional properties of typical bilevel images to achieve an average 30:1 compression.

The JBIG (Joint Bilevel Image Group) has defined a method for the compression of bilevel images called JBIG2 that is able to yield higher compression ratios than the older Group 3 and Group 4 fax algorithms with a more complex encoder/decoder combination. Essentially JBIG2 relies on the encoder to successfully segment an input image into a number of regions that are compressed with techniques specialised according to the properties of the region being encoded. Regions that contain text elements are encoded using an algorithm that stores encoded versions of bitmaps corresponding to each character. Regions that contain half toned images (particularly for the case when ordered half toning has been used) are encoded by storing a dictionary of half toned patterns and the regions to which they apply. Regions that contain other elements such as line art are encoded into a compressed bitmap representation.

In certain instances, page compression may not be required. In that case, the page compression module 38 functions using null compression wherein the page is not compressed at all and the page compression module 38 functions as a pass through module.

The printer controller 42 is responsible for handling the hardware specific aspects of the printing process. This enables a number of different types of printing mechanisms or printers 100 to be adopted without changing details of the system further up the chain of print modules.

The printer controller 42 receives a rasterized version of each page which is usually compressed using one of the compression techniques described above. The page may be received in its entirety or in a bandwise fashion depending on the size of the page and the functioning of the preceding modules 34 and 38.

In the printer controller 42, the page data are progressively accessed in printer order, decompressed if required and organised into a format suitable for hardware of the printer 100 to enable the hardware of the printer 100 to program its printhead 300. This recognition may include such factors as may be necessary to account for special characteristics of a particular printhead 300 such as up scaling and dithering of the print data and adjustments, if necessary, for the markers and paper being used.

Referring to FIGS. 2 to 7 of the drawings, the printer 100 is described in greater detail.

The printer 100 includes a chassis 112 (FIG. 3) which is covered by a top cover 116. The printer 100 has an access opening 118 in the top cover. The access opening 118 is closed off by a flap 120. The flap 120 is spring biased so that, when a cartridge 122 has been removed from the printer 100, the flap is urged upwards to close off the access opening 118.

The device which sends commands to the printer 100 can either be hard wired to the printer 100, for example, via a wiring loom of the motor vehicle or, instead, the device may send commands to the printer 100 in a wireless manner. For this purpose, the printer 100 includes a port 124 able to detect wireless communications, such as infra-red communications.

Figure 3:
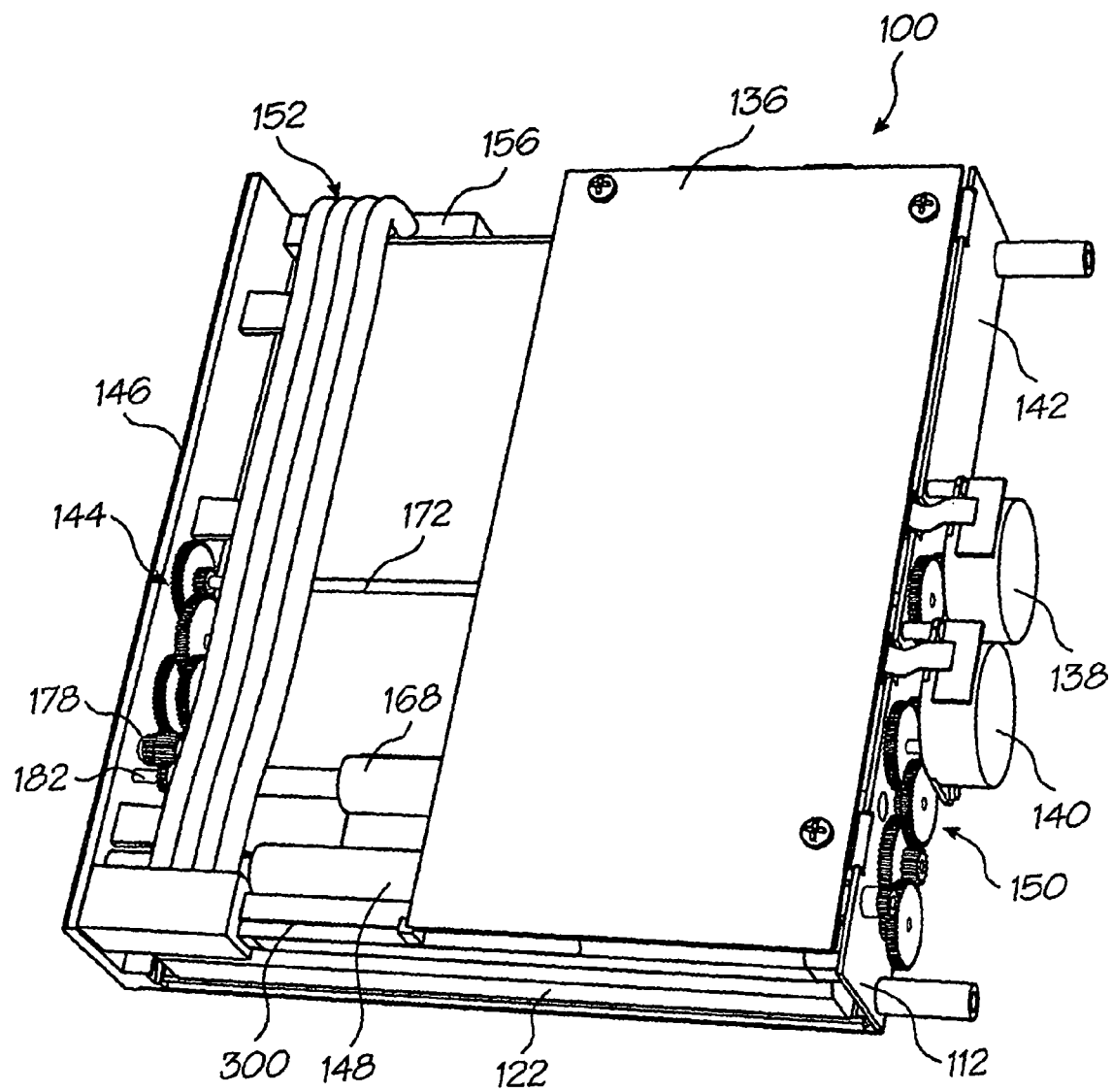
FIG. 3 shows a three dimensional view of the printer with a cover removed.

The printer 100 incorporates a printhead 300 (FIG. 3). The printhead 300 is a pagewidth ink jet printhead. More particularly, the printhead 300 is a four color printhead, or three color plus infra red ink, printhead which prints photo quality prints on print media stored in the cartridge 122. The printhead 300 comprises an array of nozzles to provide printing at 1600 dpi. The nozzles of the printhead 300 are manufactured using the applicant's Memjet technology. The printhead is described in greater detail below.

The printhead 300 receives commands from a printed circuit board (PCB) 136 secured to the chassis 112.

A pair of drive motors 138 and 140 are mounted on a sidewall 142 of the chassis 112. The drive motor 138, which is in the form of a stepper motor, drives a first drive arrangement in the form of a first gear train 144. The first gear train 144 is mounted on a side molding 146 of the chassis 112.

The drive motor 140, which is also in the form of a stepper motor, drives a drive roller 148 via a second drive arrangement in the form of a second gear train 150.

The printhead 300 receives ink from ink hoses 152 which communicate with an ink supply reservoir 154 (FIG. 7) of the cartridge 122 via an ink supply manifold 156, as will be described in greater detail below.

Figure 4:
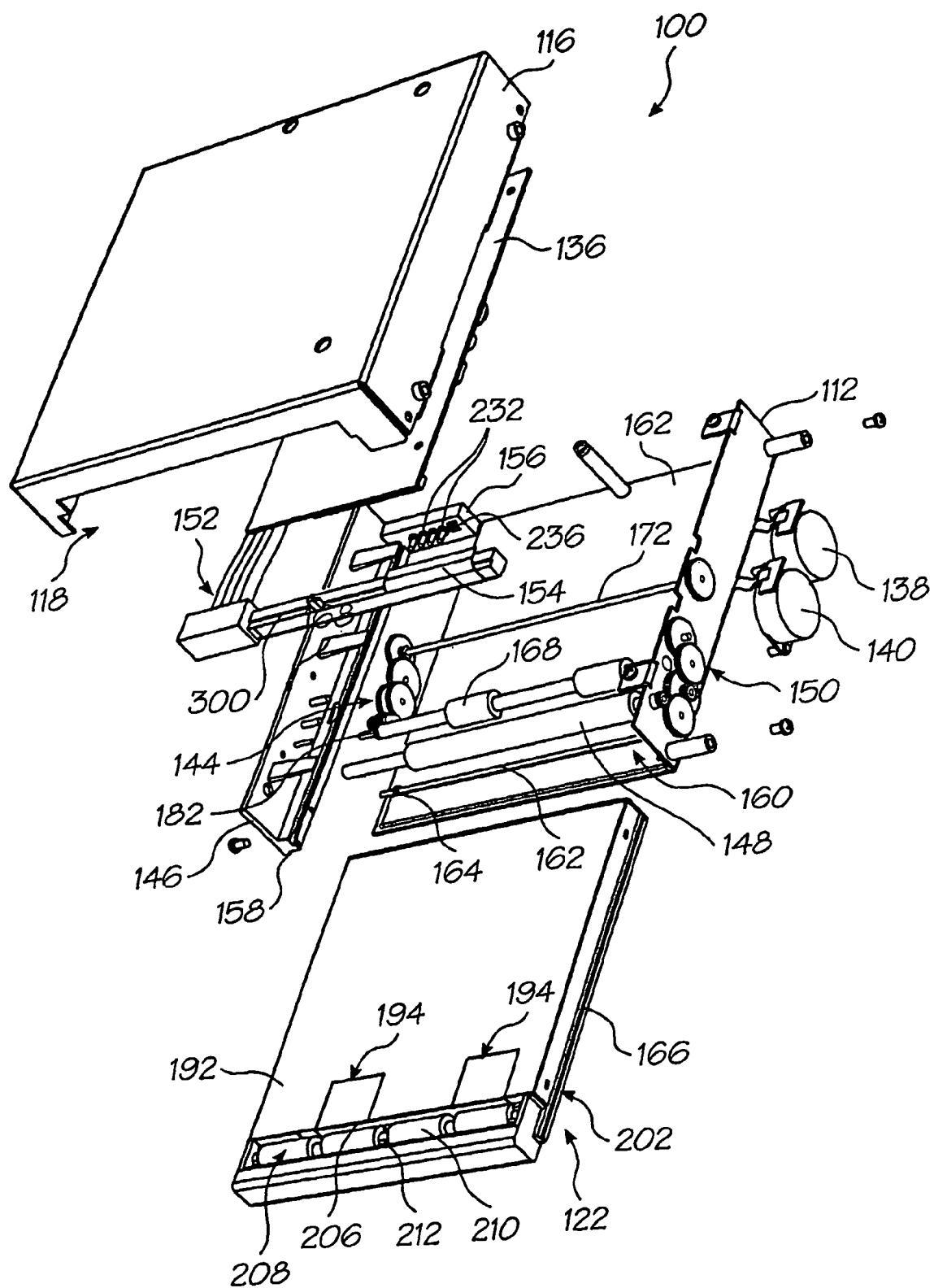
FIG. 4 shows a three dimensional, exploded view of the printer.
Figure 5:
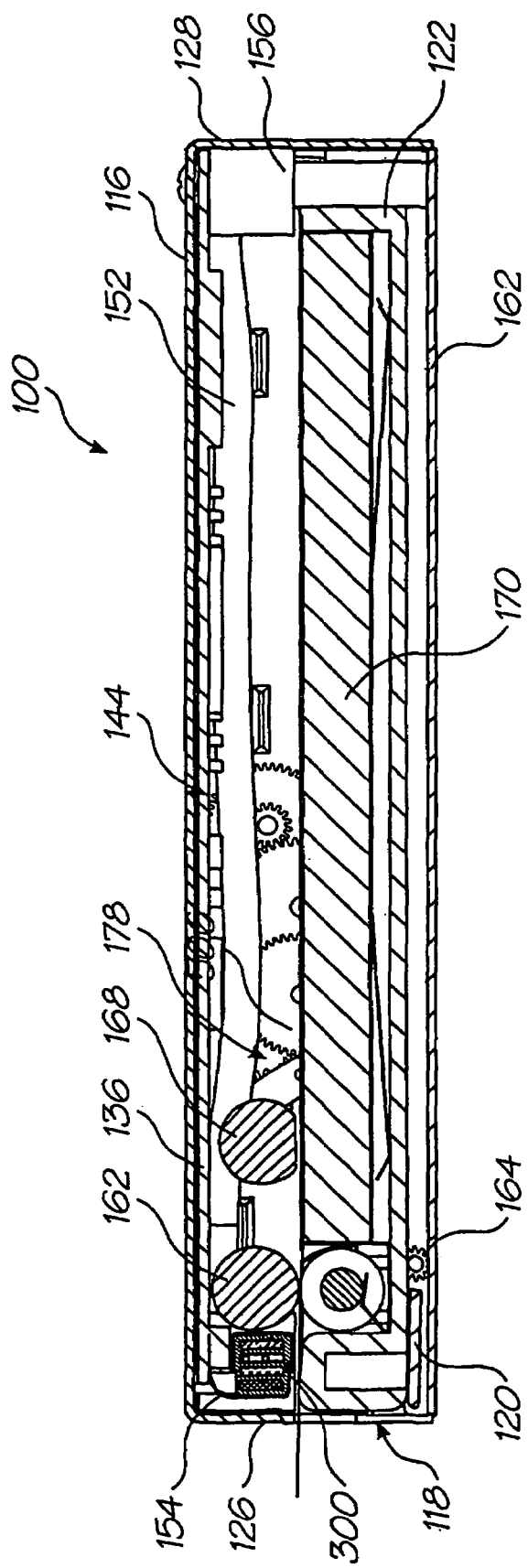
FIG. 5 shows a sectional side view of the printer.

Referring to FIG. 4 of the drawings, an exploded view of the printer 100 is illustrated. It is to be noted that the printhead 300 communicates with the PCB 136 via a TAB film 154.

A slot 158 is defined in the side molding 146. The slot 158 receives a corresponding formation of the cartridge 122 in it. Further, a roller set 160 is mounted on a base 162 of the printer 100. The roller set 160 comprises a rotatable axle 162. A cog 164 is mounted proximate each end of the axle 162. Each cog 164 engages a longitudinally extending rack 200, 202, one on each side of the cartridge 122, for inhibiting skewing of the cartridge 122 as it is inserted into, or withdrawn from, the printer 100.

The first gear train 144 engages a pick up roller 168 of the printer 100. The pick up roller 168 picks up print media in the form of a sheet of paper from a stack 170 of paper (FIG. 5) in the cartridge 122 for feeding to the printhead 300 of the printer 100 when printing is to be effected.

As shown in greater detail in FIG. 4 of the drawings, the first gear train 144 is powered by the stepper motor 138 via an axle 172 extending across the printer 100 to convey power from the stepper motor 138 to the first gear train 144. A gear 174 is mounted against the molding 146 at one end of the axle 172. The gear 174 drives a reduction gear set 176. Further, the reduction gear set 176 communicates with a reversing mechanism 178. Accordingly, the gear train 144 performs two functions. When the reversing mechanism 178 is not selected, the gear train 144 engages an upper rack 180 on the cartridge 122 for feeding the cartridge 122 into the printer 100 or ejecting the cartridge 122 from the printer 100. Instead, when the reversing mechanism has been selected, it engages the pick up roller 168 or, more particularly, a gear 182 mounted at an end of the pick up roller 168. The gear train 144 then serves to feed the paper to the drive roller 148 for conveying to the printhead 300.

Figure 6:
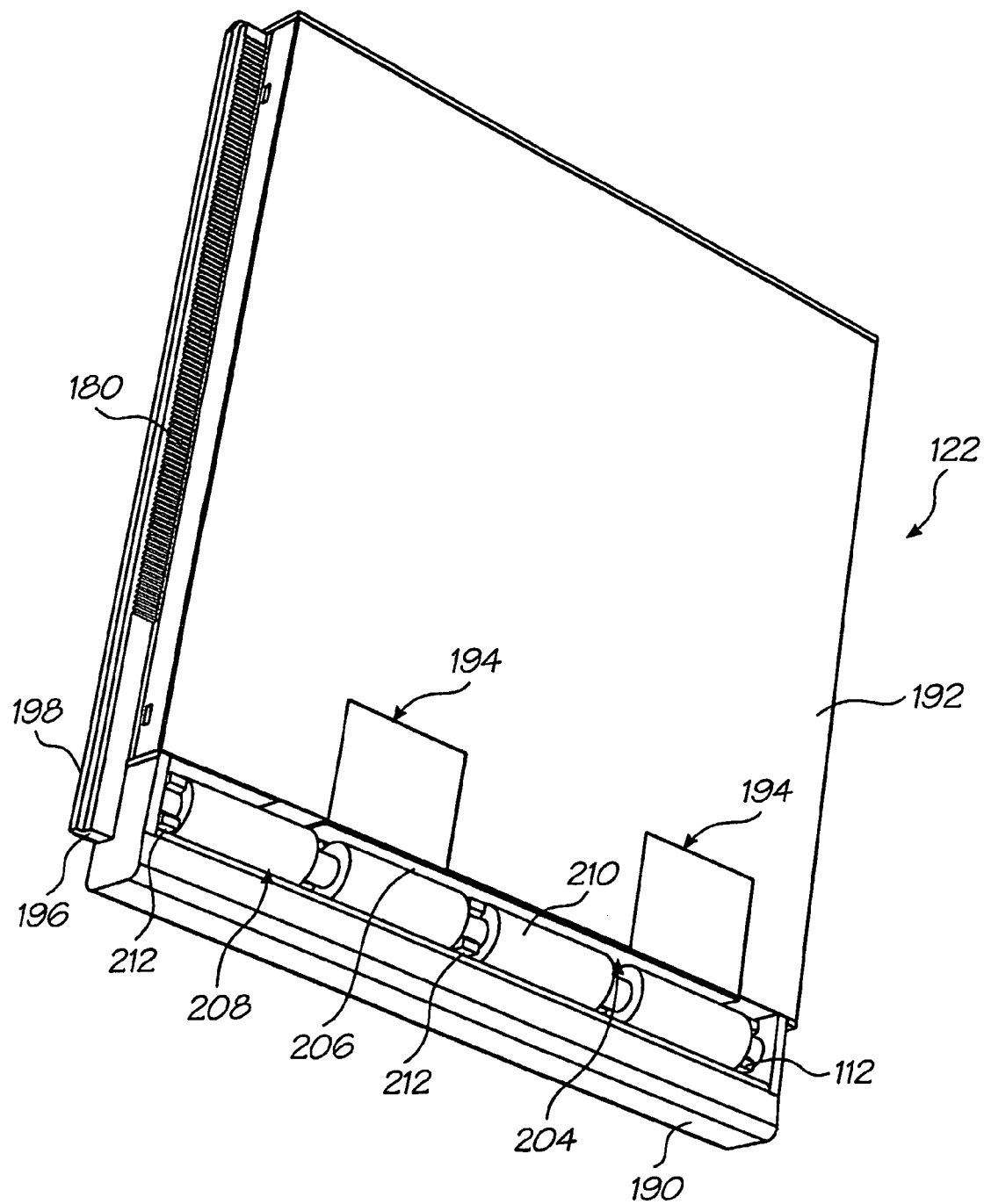
FIG. 6 shows a three dimensional view of a cartridge for the printer.
Figure 7:
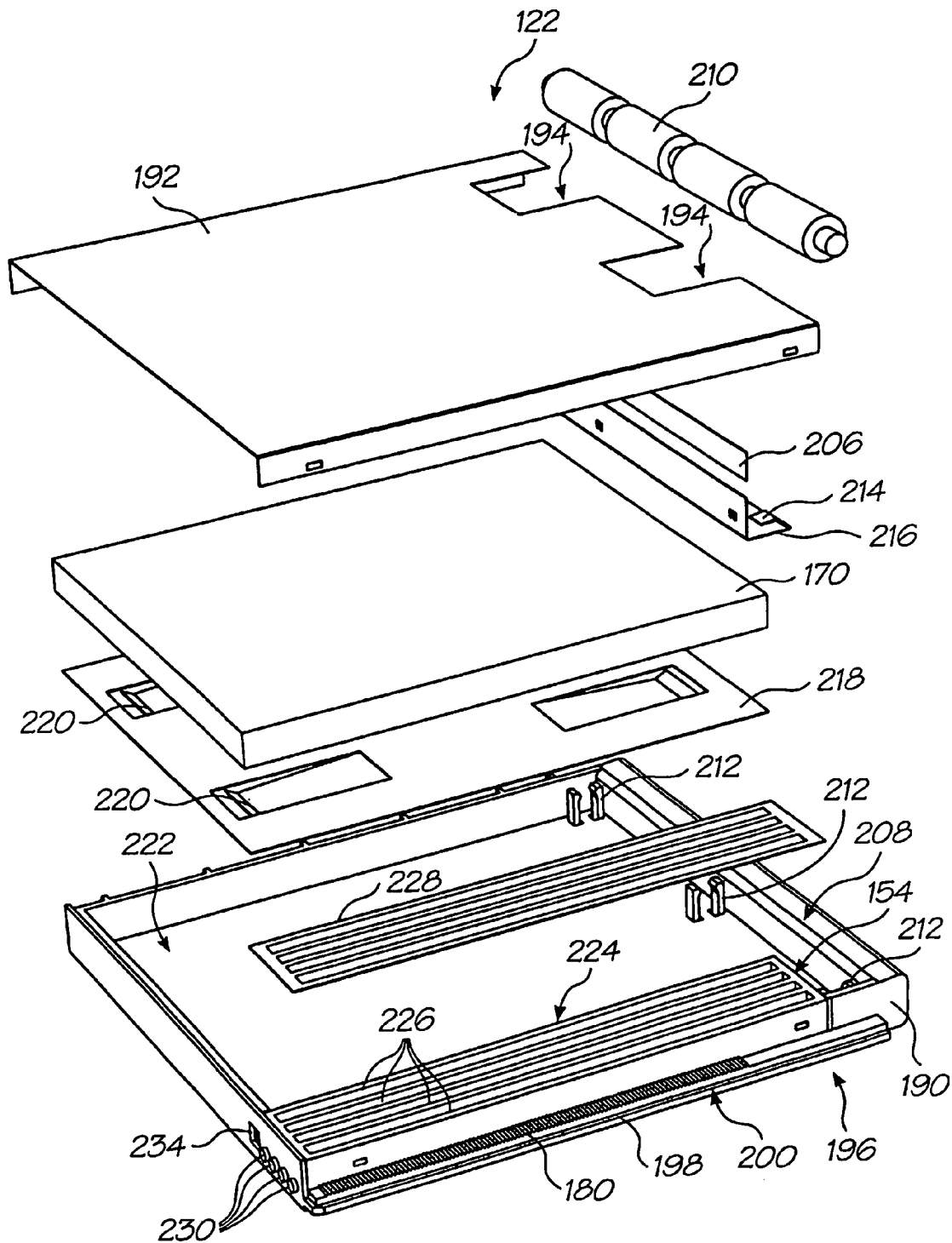
FIG. 7 shows a three dimensional, exploded view of the cartridge.

Referring now to FIGS. 6 and 7 of the drawings, the cartridge 122 is described in greater detail.

The cartridge 122 comprises a base molding 190. The base molding 190 is closed off by a metal cover 192. The cover 192 has a pair of transversely spaced openings 194 defined in a front edge thereof. These openings 194 permit the pick up roller 168 of the printer 100 to engage a topmost sheet of the stack 170 of paper within the cartridge 122.

A toothed rack 196 is provided on one side of the cartridge 122. The toothed rack 196 defines the upper rack 180 which is engaged by a gear of the first gear train 144 for insertion of the cartridge 122 into, or its ejection from, the printer 100. A rib 198 extends longitudinally along the side of the toothed rack 196. The rib 198 is received in the slot 158 in the side molding 146 of the printer 100. A lower surface of the toothed rack 196 also has one of the longitudinally extending racks 200 (FIG. 7) for engagement with one of the cogs 164. An opposed side of the base molding 190 of the cartridge 122 carries the other of the longitudinally extending racks 202 which engages the other cog 164 for inhibiting skewing of the cartridge 122 when it is inserted into, or ejected from, the printer 100.

A feed slot 204 is defined at a front edge of the metal cover through which a sheet of paper to be printed is passed in use. The feed slot 204 is partially defined by a plastics strip 206 which inhibits more than one sheet of paper being fed to the printhead 300 at any one time.

A transversely extending trough 208 is defined outwardly of the strip 206. The trough 208 accommodates a sprung roller 210 therein. The roller 210 is supported in the trough 208 via a plurality of clips 212.

The roller 210 is biased upwardly relative to a base of the trough 208 via a plurality of leaf springs 214. The leaf springs 214 are formed integrally with an L-shaped metal bracket 216 which partially forms the trough 208. The roller 210 is a snap-fit in the clips 212.

A platen 218 is accommodated in the base molding 190. The platen 218 is spring biased via a plurality of leaf springs 220 which engage a floor 222 of the base molding 190 for urging the stack 170 of paper against the cover 192.

The ink supply reservoir 154 includes an ink supply molding 224 formed integrally with the base molding 190. The ink supply molding 224 defines a plurality of ink supply channels 226. Each ink supply channel 226 contains a particular color of ink. In this context, the term "color" is to be understood as including inks which are invisible in the visible spectrum such as, for example, infra red inks.

The channels 226 are closed off by a flexible bladder-like membrane 228 which is heat-sealed to the molding 224. It will be appreciated that, as ink is withdrawn from each channel 226, the associated membrane 228 collapses into the channel 226 thereby inhibiting the ingress of air into that channel 226.

Each channel 226 communicates with an ink outlet 230. Each ink outlet 230 is in the form of a rupturable seal.

As shown in greater detail in FIG. 4 of the drawings, the ink supply manifold 156 of the printer 100 includes pins 232. These pins 232 communicate with the ink supply hoses 152. When the cartridge 122 is inserted into the printer 100, and the cartridge 122 is driven home by the gear train 144, the pins 232 pierce the seals 230 to place the hoses 152 in communication with their associated ink supply channels 226.

The cartridge 122 includes a quality assurance chip 234. This chip 234 ensures correct communications between the cartridge 122 and the printer 100 and that the cartridge 122 is of the required quality. The chip 234 communicates with the printer 100 via chip contacts 236 mounted on the ink supply manifold 156 of the printer 100. Thus, when the cartridge 122 is driven home by the gear train 144, the chip 234 engages the contacts 236 for enabling communications to be established between the chip 234 and the circuit board 136 of the printer 100.

The cartridge 122 is a disposable unit so that, once its ink supply and paper supply have been depleted, the cartridge is disposed of. Instead, the cartridge 122 may be re-useable. In the latter case, once the supply of ink and paper in the cartridge 122 have been depleted and the cartridge 122 is ejected from the printer 100, the used, empty cartridge 122 can be taken by a user to a supplier for a refund. It is to be noted that the cartridge 122 is automatically ejected from the printer 100 once its supply of paper and/or ink has been depleted.

Figure 8:
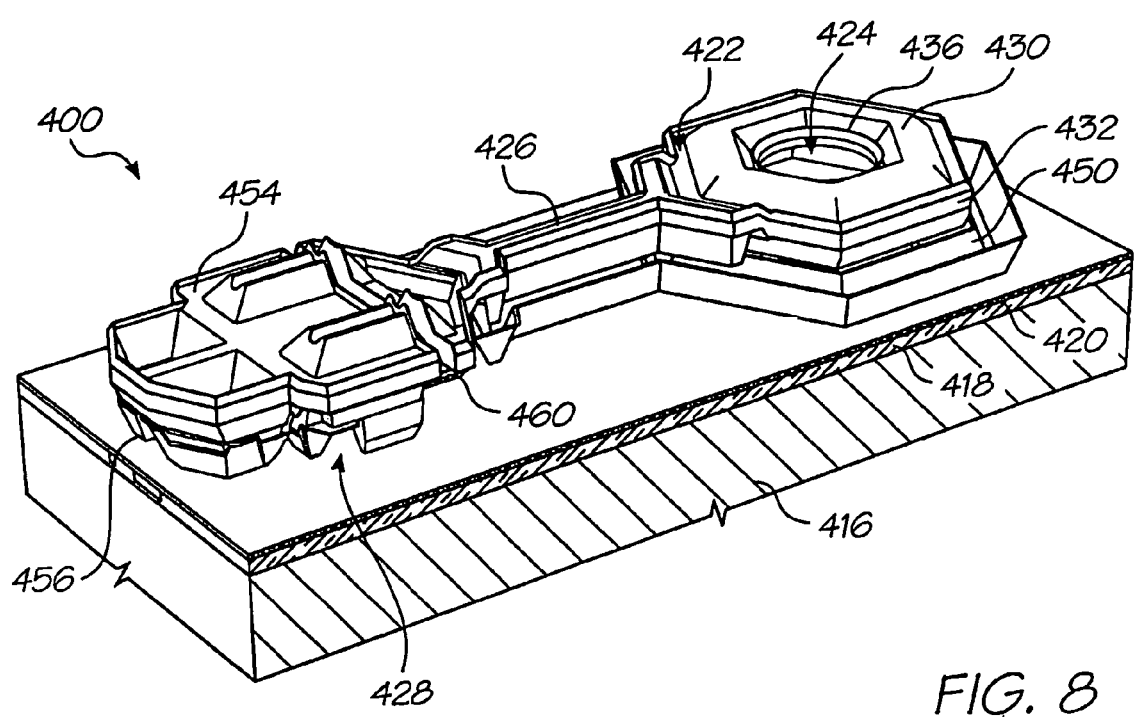
FIG. 8 shows a three dimensional, schematic view of a nozzle assembly for an ink jet printhead for the printer.

Referring to FIGS. 8 to 14 of the drawings, the printhead 300 is described in greater detail. The printhead 300 comprises an array, which will be described in greater detail below, of nozzle assemblies. Referring initially to FIG. 8 of the drawings, a nozzle assembly is illustrated and is designated generally by the reference numeral 400

The assembly 400 includes a silicon substrate or wafer 416 on which a dielectric layer 418 is deposited. A CMOS passivation layer 420 is deposited on the dielectric layer 418.

Each nozzle assembly 400 includes a nozzle 422 defining a nozzle opening 424, a connecting member in the form of a lever arm 426 and an actuator 428. The lever arm 426 connects the actuator 428 to the nozzle 422.

Figure 9:
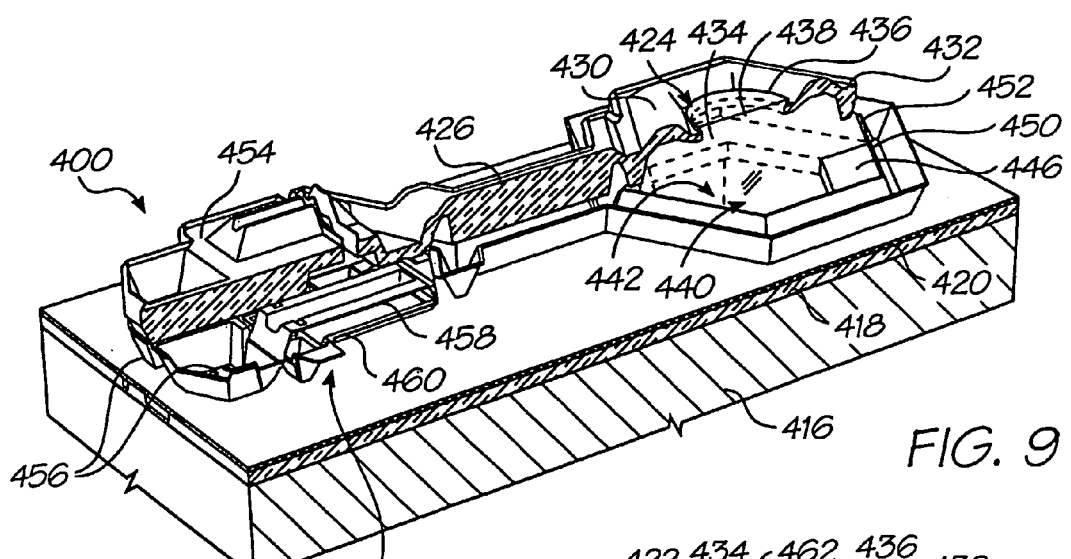
FIGS. 9 to 11 show a three dimensional, schematic illustration of an operation of the nozzle assembly of FIG. 8.
Figure 10:
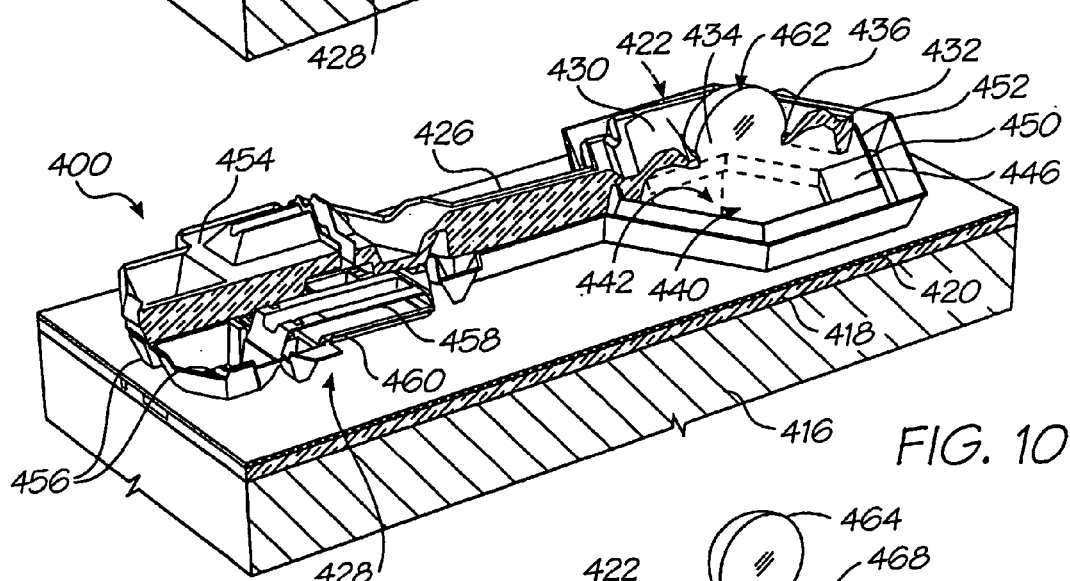
Figure 11:
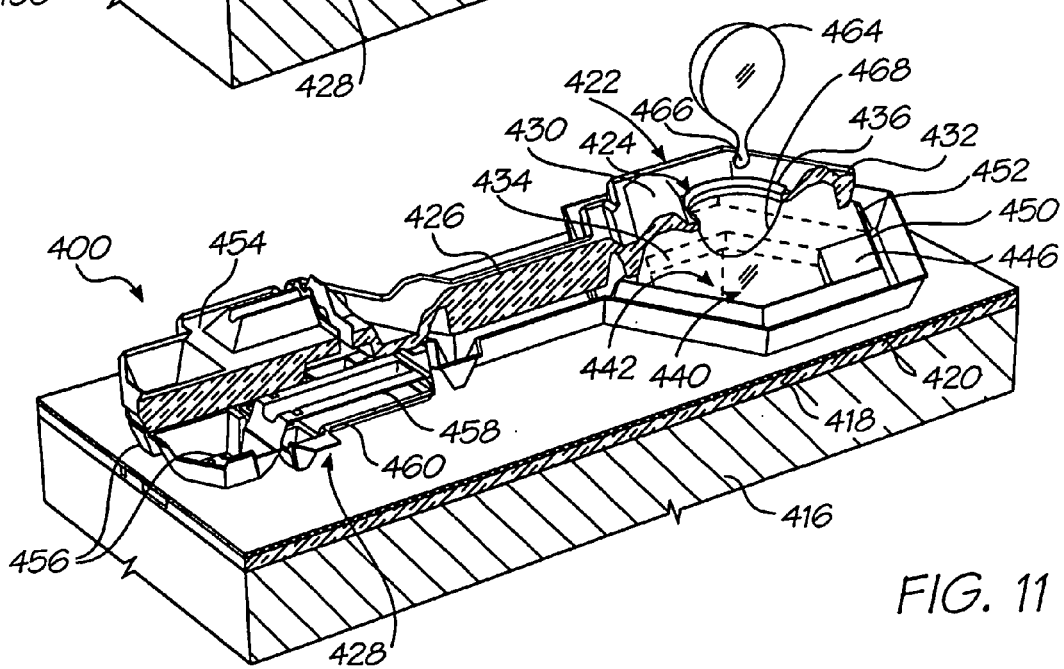

As shown in greater detail in FIGS. 9 to 11 of the drawings, the nozzle 422 comprises a crown portion 430 with a skirt portion 432 depending from the crown portion 430. The skirt portion 432 forms part of a peripheral wall of a nozzle chamber 434. The nozzle opening 424 is in fluid communication with the nozzle chamber 434. It is to be noted that the nozzle opening 424 is surrounded by a raised rim 436 which "pins" a meniscus 438 (FIG. 9) of a body of ink 440 in the nozzle chamber 434.

An ink inlet aperture 442 (shown most clearly in FIG. 13 of the drawings) is defined in a floor 446 of the nozzle chamber 434. The aperture 442 is in fluid communication with an ink inlet channel 448 defined through the substrate 416.

A wall portion 450 bounds the aperture 442 and extends upwardly from the floor portion 446. The skirt portion 432, as indicated above, of the nozzle 422 defines a first part of a peripheral wall of the nozzle chamber 434 and the wall portion 450 defines a second part of the peripheral wall of the nozzle chamber 434.

The wall 450 has an inwardly directed lip 452 at its free end which serves as a fluidic seal which inhibits the escape of ink when the nozzle 422 is displaced, as will be described in greater detail below. It will be appreciated that, due to the viscosity of the ink 440 and the small dimensions of the spacing between the lip 452 and the skirt portion 432, the inwardly directed lip 452 and surface tension function as a seal for inhibiting the escape of ink from the nozzle chamber 434.

The actuator 428 is a thermal bend actuator and is connected to an anchor 454 extending upwardly from the substrate 416 or, more particularly, from the CMOS passivation layer 420. The anchor 454 is mounted on conductive pads 456 which form an electrical connection with the actuator 428.

The actuator 428 comprises a pair of first, active beams 458 arranged above a pair of second, passive beams 460. In a preferred embodiment, both pairs of beams 458 and 460 are of or include, a conductive ceramic material such as titanium nitride (TiN).

Both pairs of beams 458 and 460 have their first ends anchored to the anchor 454 and their opposed ends connected to the arm 426. When a current is caused to flow through the active beams 458 thermal expansion of the beams 458 result. As the passive beams 460, through which there is no current flow, do not expand at the same rate, a bending moment is created causing the arm 426 and, hence, the nozzle 422 to be displaced downwardly towards the substrate 416 as shown in FIG. 10 of the drawings. This causes ejection of ink through the nozzle opening 424 as shown at 462 in FIG. 10 of the drawings. When the source of heat is removed from the active beams 458, i.e. by stopping current flow, the nozzle 422 returns to its quiescent position as shown in FIG. 11 of the drawings. When the nozzle 422 returns to its quiescent position, an ink droplet 464 is formed as a result of the breaking of an ink droplet neck as illustrated at 466 in FIG. 11 of the drawings. The ink droplet 464 then travels on to the print media such as a sheet of paper. As a result of the formation of the ink droplet 464, a "negative" meniscus is formed as shown at 468 in FIG. 11 of the drawings. This "negative" meniscus 468 results in an inflow of ink 440 into the nozzle chamber 434 such that a new meniscus 438 is formed in readiness for the next ink drop ejection from the nozzle assembly 400.

Figure 12:
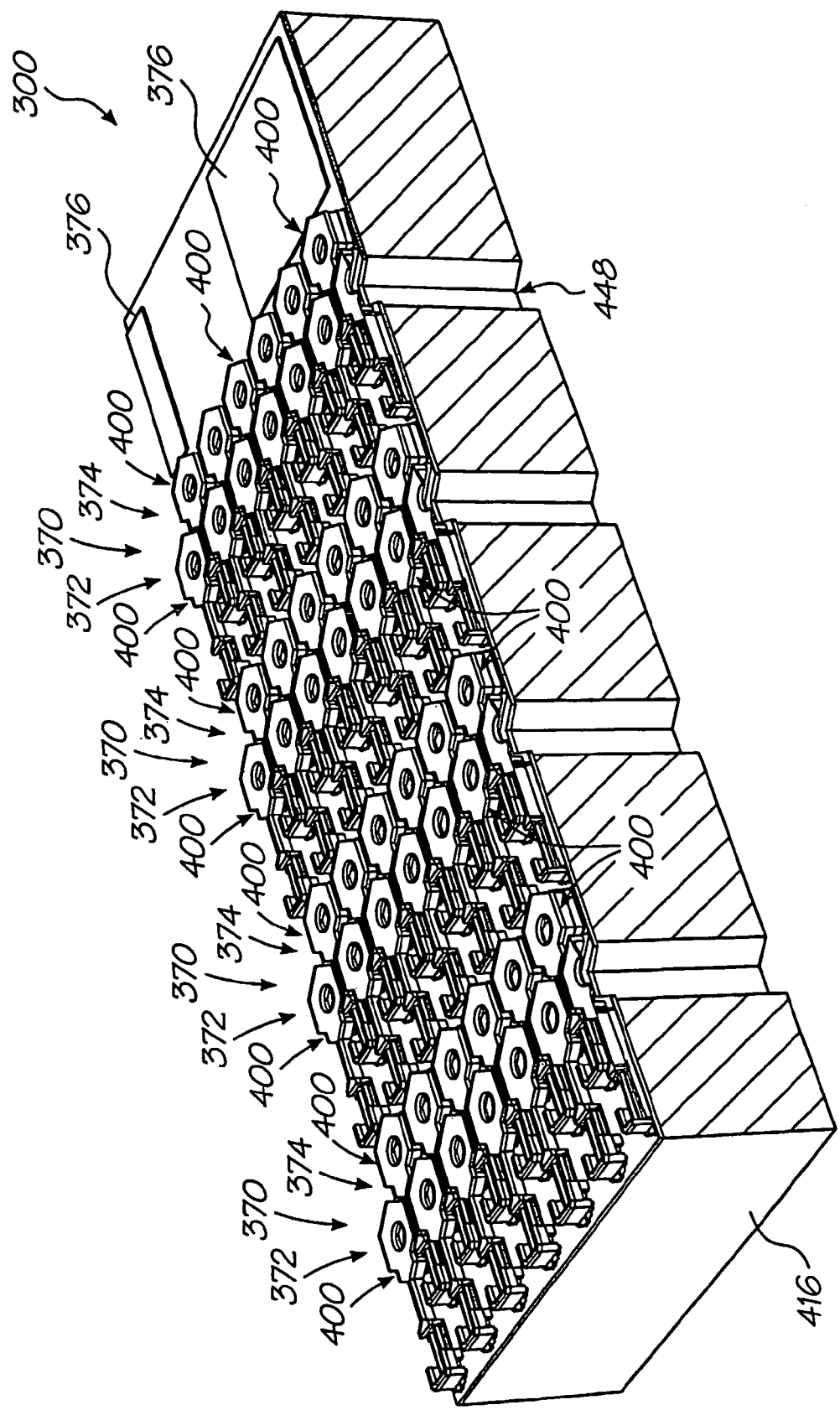
FIG. 12 shows a three dimensional view of a nozzle array constituting the printhead.
Figure 13:
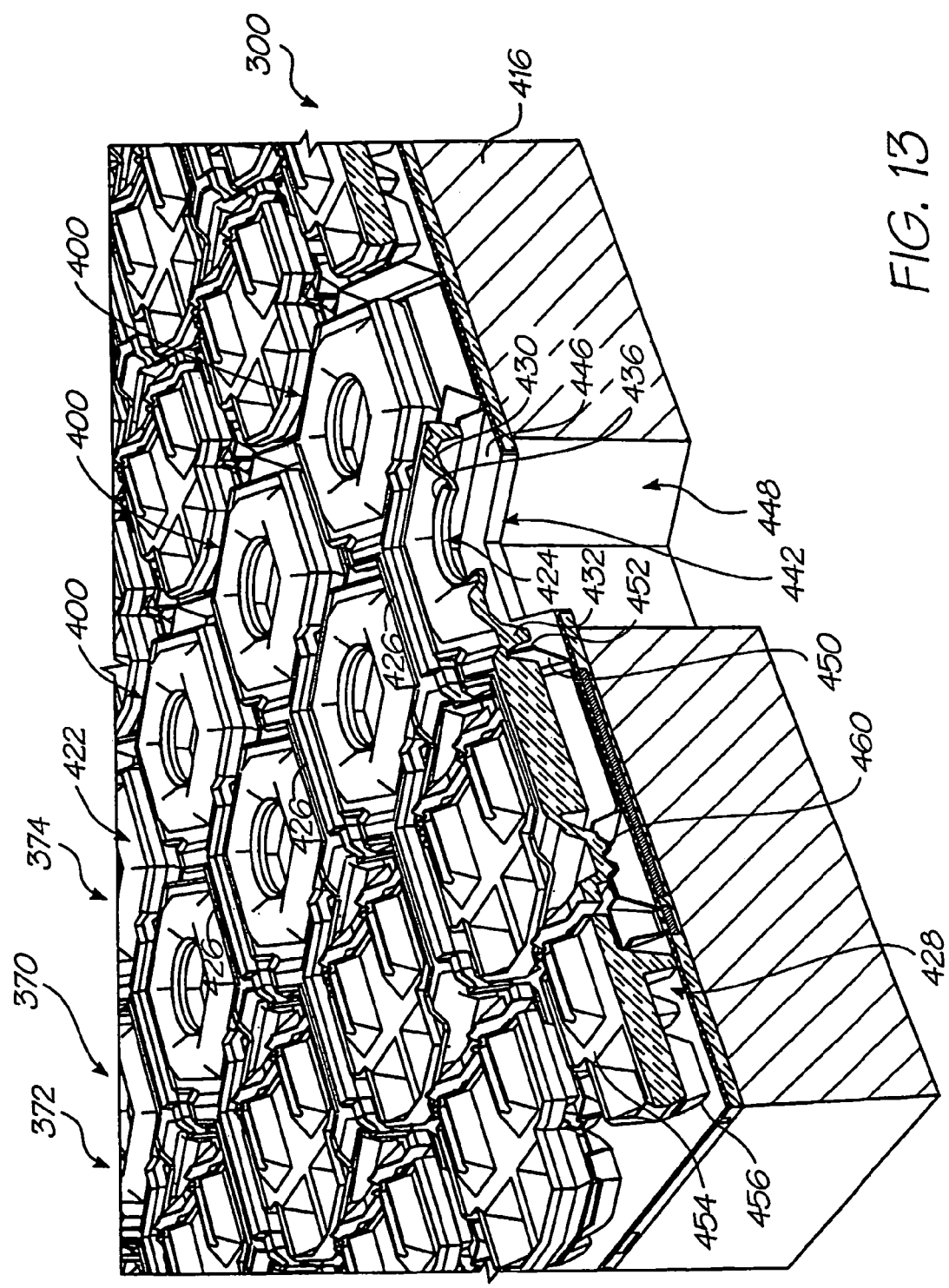
FIG. 13 shows, on an enlarged scale, part of the array of FIG. 12.
Figure 14:
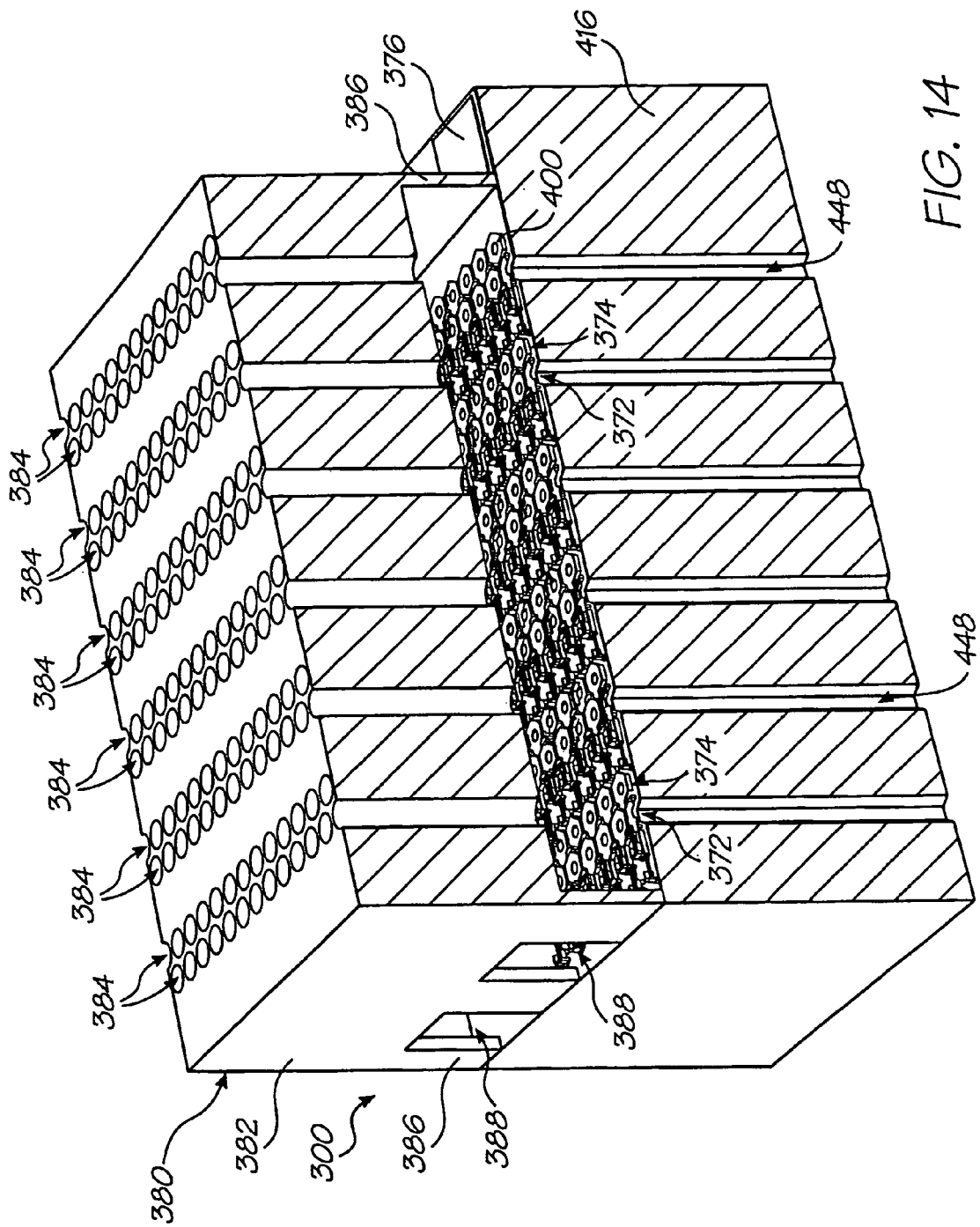
FIG. 14 shows a three dimensional view of the printhead including a nozzle guard.

Referring now to FIGS. 12 to 14 of the drawings, a part of the printhead 300 is described in greater detail. The printhead 300 is a four color printhead. Accordingly, the printhead 300 includes four groups 370 of nozzle assemblies, one for each color. Each group 370 has its nozzle assemblies 400 arranged in two rows 372 and 374. One of the groups 370 is shown in greater detail in FIG. 13 of the drawings.

To facilitate close packing of the nozzle assemblies 400 in the rows 372 and 374, the nozzle assemblies 400 in the row 374 are offset or staggered with respect to the nozzle assemblies 400 in the row 372. Also, the nozzle assemblies 400 in the row 372 are spaced apart sufficiently far from each other to enable the lever arms 426 of the nozzle assemblies 400 in the row 374 to pass between adjacent nozzles 422 of the assemblies 400 in the row 372. It is to be noted that each nozzle assembly 400 is substantially dumbbell shaped so that the nozzles 422 in the row 372 nest between the nozzles 422 and the actuators 428 of adjacent nozzle assemblies 400 in the row 374.

Further, to facilitate close packing of the nozzles 422 in the rows 372 and 374, each nozzle 422 is substantially hexagonally shaped.

The substrate 416 has bond pads 376 arranged thereon which provide the electrical connections, via the pads 456, to the actuators 428 of the nozzle assemblies 400. These electrical connections are formed via the CMOS layer (not shown).

A nozzle guard 380 is mounted on the substrate 416 of the printhead 300. The nozzle guard 380 includes a body member 382 having a plurality of passages 384 defined therethrough. The passages 384 are in register with the nozzle openings 424 of the nozzle assemblies 400 of the printhead 300 such that, when ink is ejected from any one of the nozzle openings 424, the ink passes through the associated passage 384 before striking the print media.

The body member 382 is mounted in spaced relationship relative to the nozzle assemblies 400 by limbs or struts 386. One of the struts 836 has air inlet openings 388 defined therein.

When the printhead 300 is in operation, air is charged through the inlet openings 388 to be forced through the passages 384 together with ink travelling through the passages 384. The purpose of the air is to maintain the passages 384 clear of foreign particles. A danger exists that these foreign particles, such as dust particles, could fall onto the nozzle assemblies 400 adversely affecting their operation. With the provision of the air inlet openings 388 in the nozzle guard 380 this problem is, to a large extent, obviated.

Figure 16:
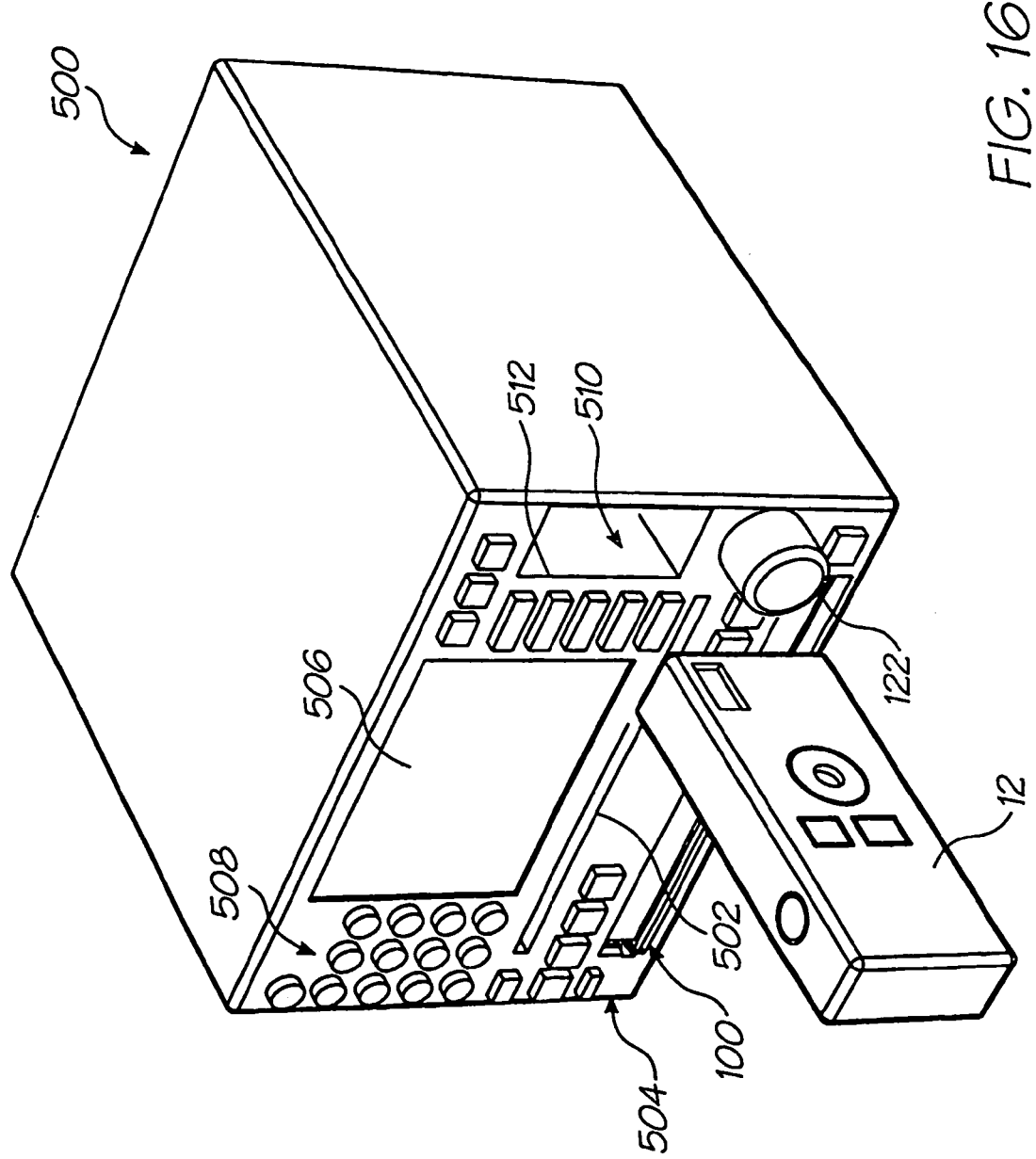
FIG. 16 shows a three dimensional view of an implementation of the information retrieval system.

In another embodiment of the invention, the printer 100 is built into and forms part of an in-car entertainment unit 500, as shown in FIG. 16 of the drawings.

The ICE unit 500, in addition to a CD player 502 and a radio having controls 504, includes a full color LCD 506. The unit 500 functions as a satellite navigation unit and may also be used for receiving television signals. The unit 500 incorporates a printer 100 of the type described above. The unit 500 includes a bank of control buttons 508. This bank of buttons 508 constitutes GPS controls and is used for satellite navigation purposes. In addition, the unit includes a slot 510 in which the camera 12 is received to enable images which have previously been captured and which are stored in the camera 12 to be downloaded and printed via the printer 100. The ICE 500 includes a further bank of buttons 512 for controlling the printer 100 and the content printed by the printer 100.

In use, the user, upon retuning to the motor vehicle with the camera 12 which has captured various images connects the camera 12 to the remainder of the system 10 via the receiving slot 510 for the camera 12 in the ICE 500 or via some other suitable connection, for example, by USB cable, by removing the storage device of the camera 12 and inserting it into the system 10, by wireless connection, or the like.

The images captured by the camera 12 are transferred to the layout engine 28. The layout engine 28 may also receive a layout determined by the camera 12 during this process. For this purpose, the camera 12 may have built in features for selecting a layout style for each photograph or for grouping a set of photographs on a page of output. The layout engine 28 performs layout of the data elements according to the layout information and generates a description of one or more pages in a suitable page description language such as postscript or PDF which is output on the data line 32 to the rasterization module 34 of the processing means 14. The rasterization module 34, in turn, communicates data along line 36 to the page compression module 38 of the processing means 14.

The rasterization module 34 and the page compression module 38 format the data into a suitable format to be printed by the printer 100. Formatted data is, accordingly, output from the page compression module 38 on data line 40 to the printer controller 42 of the printing unit 16. The printer controller 42 controls operation of the printer 100, as described above and the printer generates hard copies of the images captured by then camera 12.

Where provided, the wireless communications sub-system 50 can be used for downloading images captured by the camera 12 to a remote storage database. This remote storage database may have facilities for, for example, automatically publishing the set of photographs on a website. Instead, the remote storage database may simply act as a repository from which the set of photographs may later be retrieved and viewed or otherwise used as desired by the user.

Accordingly, it is an advantage of the invention that an in-vehicle image processing system is provided which effectively acts as a mobile image processing laboratory and facilitates the almost instantaneous production of photographs. Consequently, a user need not await return to a suitable place to have the images processed into hard copies.

It will be appreciated that a related advantage is that, if a poor image has been captured, this can be detected and rectified while the person is at the venue rather than, possibly, missing out on having an images captured at all.

Another advantage of the invention is that an integrated system is built into the vehicle having a receptacle for the camera, being the slot, and a built-in printer 100.

I claim:

1. An image printing system which includes:
   a portable data capturing device for capturing data relating to an image which it is desired to print;
   a processing means, in communication with said data capturing device, for processing output data which is output from said data capturing device to provide formatted data suitable for printing; and
   an onboard printing unit, associated with said processing means, for printing said formatted data to provide said image, wherein the onboard printing unit comprises a printer configured to receive a removable cartridge comprising a base for receiving a stack of print media and an ink reservoir, wherein the stack of print media comprises a plurality of separate print media sheets, wherein the onboard printing unit comprises a gear train which engages a roller configured to remove one of the print media sheets from the stack which is fed to a printhead of the printer to effect printing, wherein the gear train cooperates with a reversing mechanism, wherein the reversing mechanism can be placed in a first state, wherein the gear train engages an upper rack on the cartridge for receiving or ejecting the cartridge, and a second state, wherein the gear train engages the roller to remove one of the print media sheets from the stack.

2. The system of claim 1 in which the data capturing device is a camera.

3. The system of claim 2 in which the camera is a digital camera.

4. The system of claim 3 which includes a receiving means which communicates with the camera to enable data relating to an image captured by the camera and stored in the camera to be received and downloaded to the processing means.

5. The system of claim 1 which includes a communications sub-system mounted in the conveyance for enabling data stored in the data capturing device to be transmitted to a remote location.

6. The system of claim 1 in which the processing means includes a layout engine in communication with the detecting means.

7. The system of claim 6 in which the layout engine lays out data elements to be communicated to the printer so that, when printed on a suitable print media, the data are presented as a visually discernible image.

8. The system of claim 6 in which the processing means further comprises a data manipulating means in communication with the layout engine for manipulating the data to provide the formatted data.

9. The system of claim 8 in which the printing unit includes a printer controller, for receiving the formatted data to be printed, and a printer.

10. The system of claim 9 in which the printer comprises a pagewidth ink jet printhead.

11. The system of claim 10 in which the printhead comprises an array of nozzles, said array being fabricated by microelectromechanical techniques.

12. The system according to claim 1 wherein the printer is configured to automatically eject the cartridge from the printer when the ink reservoir is empty of ink or the cartridge is empty of print media.

13. A method of printing images, the method including the steps of:
    capturing data, via a data capturing means, relating to an image which it is desired to print;
    processing output data, which is output from said data capturing means, to provide formatted data suitable for printing; and
    printing, on an onboard printing unit associated with said processing means, said formatted data to provide said image, wherein the onboard printing unit comprises a printer configured to receive a removable cartridge comprising a base for receiving a stack of print media and an ink reservoir, wherein the stack of print media comprises a plurality of separate print media sheets wherein, wherein the onboard printing unit comprises a gear train which engages a roller configured to remove one of the print media sheets from the stack which is fed to a printhead of the printer to effect printing, wherein the gear train cooperates with a reversing mechanism, wherein the reversing mechanism can be placed in a first state, wherein the gear train engages an upper rack on the cartridge for receiving or ejecting the cartridge, and a second state, wherein the gear train engages the roller to remove one of the print media sheets from the stack.

14. The method of claim 13 which includes capturing the data by means of a camera.

15. The method of claim 14 which includes capturing the data by means of a digital camera.

16. The method of claim 15 which includes causing the camera to communicate with a receiving means in a conveyance to enable data relating to an image captured by the camera and stored in the camera to be received and downloaded.

17. The method of claim 13 which includes causing data stored in the data capturing device to be transmitted to a remote location.

18. The method of claim 13 which includes performing a layout operation on data elements to be communicated to the printer so that, when printed on a suitable print media, the data are presented as a visually discernible image.

19. The method of claim 18 which includes manipulating said data prior to printing the data to provide said formatted data.

20. An onboard image printing system which includes
    a camera for capturing data relating to an image which it is desired to print;
    a processing means, in communication with said camera, for processing output data which is output from said camera to provide formatted data suitable for printing; and
    an onboard printing unit, associated with said processing means, for printing said formatted data to provide said image, wherein the onboard printing unit comprises a printer configured to receive a removable cartridge comprising a base for receiving a stack of print media and an ink reservoir, wherein the stack of print media comprises a plurality of separate print media sheets, wherein the onboard printing unit comprises a gear train which engages a roller configured to remove one of the print media sheets from the stack which is fed to a printhead of the printer to effect printing, wherein the gear train cooperates with a reversing mechanism, wherein the reversing mechanism can be placed in a first state, wherein the gear train engages an upper rack on the cartridge for receiving or ejecting the cartridge and a second state, wherein the gear train engages the roller to remove one of the print media sheets from the stack.

21. The system of claim 20 which includes a receiving means which communicates with the camera to facilitate downloading of the data from the camera to the processing means.

22. A method of printing images onboard a vehicle, the method including the steps of:
    capturing data, via a camera, relating to an image which it is desired to print;
    processing output data, which is output from said camera, to provide formatted data suitable for printing; and
    printing, on an onboard printing unit associated with said processing means, said formatted data to provide said image, wherein the onboard printing unit comprises a printer configured to receive a removable cartridge comprising a base for receiving a stack of print media and an ink reservoir, wherein the stack of print media comprises a plurality of separate print media sheets, wherein the onboard printing unit comprises a gear train which engages a roller configured to remove one of the print media sheets from the stack which is fed to a printhead of the printer to effect printing, wherein the gear train cooperates with a reversing mechanism, wherein the reversing mechanism can be placed in a first state, wherein the gear train engages an upper rack on the cartridge for receiving or ejecting the cartridge, and a second state, wherein the gear train engages the roller to remove one of the print media sheets from the stack.

23. The method of claim 22 which includes causing the camera to communicate with a receiving means in the vehicle to facilitate downloading of data relating to an image captured by the camera to a processing means.

24. An onboard image printing system which includes
    a digital camera for capturing data relating to an image which it is desired to print;
    a processing means, in communication with said camera, for processing output data which is output from said camera to provide formatted data suitable for printing;
    a receiving means which communicates with the camera to facilitate downloading of the data from the camera to the processing means;
    an onboard communications sub-system for enabling data stored in the camera to be transmitted to a remote location; and
    an onboard printing unit, associated with said processing means, for printing said formatted data to provide said image, wherein the onboard printing unit comprises a printer configured to receive a removable cartridge comprising a base for receiving a stack of print media and an ink reservoir, wherein the stack of print media comprises a plurality of separate print media sheets, wherein the onboard printing unit comprises a gear train which engages a roller configured to remove one of the print media sheets from the stack which is fed to a printhead of the printer to effect printing, wherein the gear train cooperates with a reversing mechanism, wherein the reversing mechanism can be placed in a first state, wherein the gear train engages an upper rack on the cartridge for receiving or ejecting the cartridge, and a second state, wherein the gear train engages the roller to remove one of the print media sheets from the stack.

25. A method of printing images onboard a vehicle, the method including the steps of:

capturing data, via a digital camera, relating to an image which it is desired to print;

processing output data, which is output from said camera, to provide formatted data suitable for printing;

causing the camera to communicate with a receiving means in the vehicle to facilitate downloading of data relating to an image captured by the camera;

causing data stored in the camera to be transmitted to a remote location; and printing, on an onboard printing unit associated with said processing means, said formatted data to provide said image, wherein the onboard printing unit comprises a printer configured to receive a removable cartridge comprising a base for receiving a stack of print media and an ink reservoir, wherein the stack of print media comprises a plurality of separate print media sheets, wherein the onboard printing unit comprises a gear train which engages a roller configured to remove one of the print media sheets from the stack which is fed to a printhead of the printer to effect printing, wherein the gear train cooperates with a reversing mechanism, wherein the reversing mechanism can be placed in a first state, wherein the gear train engages an upper rack on the cartridge for receiving or ejecting the cartridge, and a second state, wherein the gear train engages the roller to remove one of the print media sheets from the stack.

* * * * *